March 15, 1966   J. A. STAMM   3,240,116
APPARATUS FOR IMAGE FORMATION AND PROJECTION
Filed Sept. 17, 1962   2 Sheets-Sheet 1
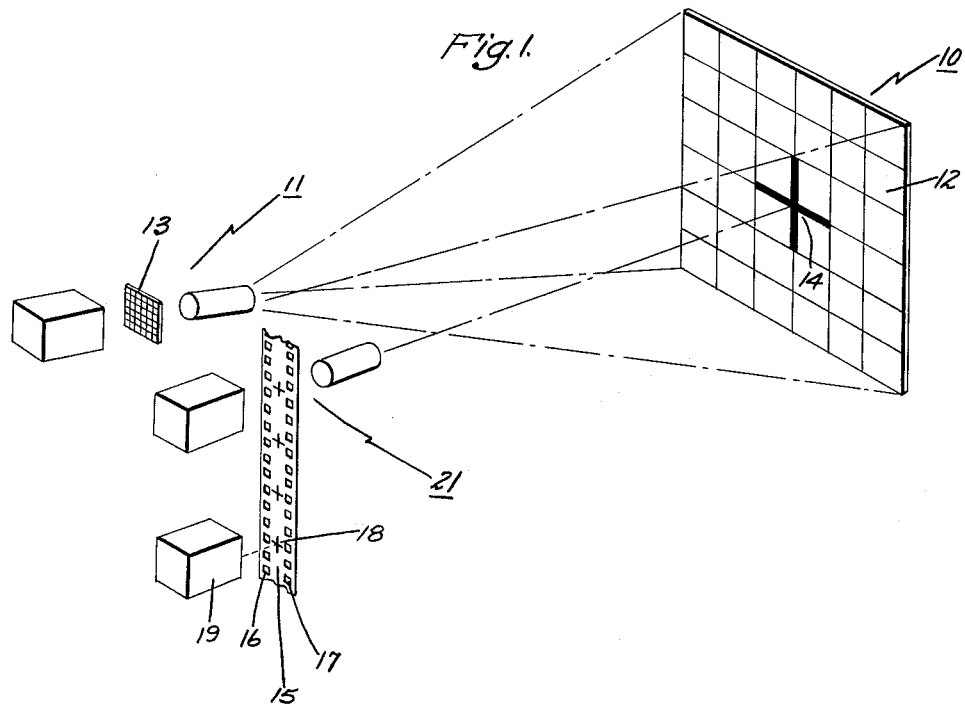
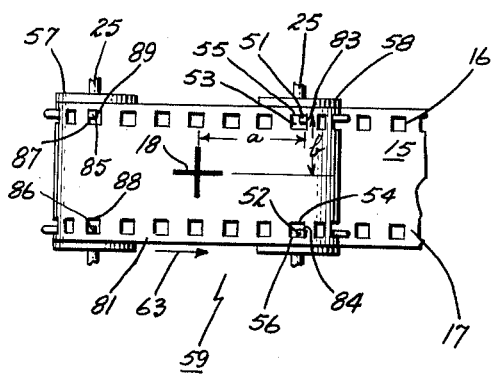
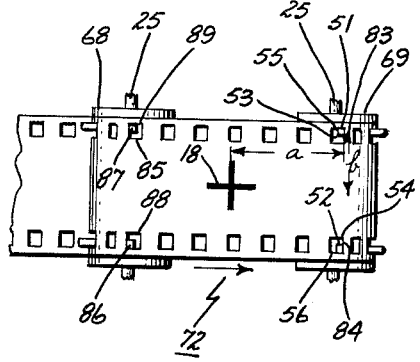
Inventor:
Joseph A Stamm,
by Percy P. Jantzy
Attorney.

March 15, 1966     J. A. STAMM     3,240,116
APPARATUS FOR IMAGE FORMATION AND PROJECTION
Filed Sept. 17, 1962     2 Sheets-Sheet 2
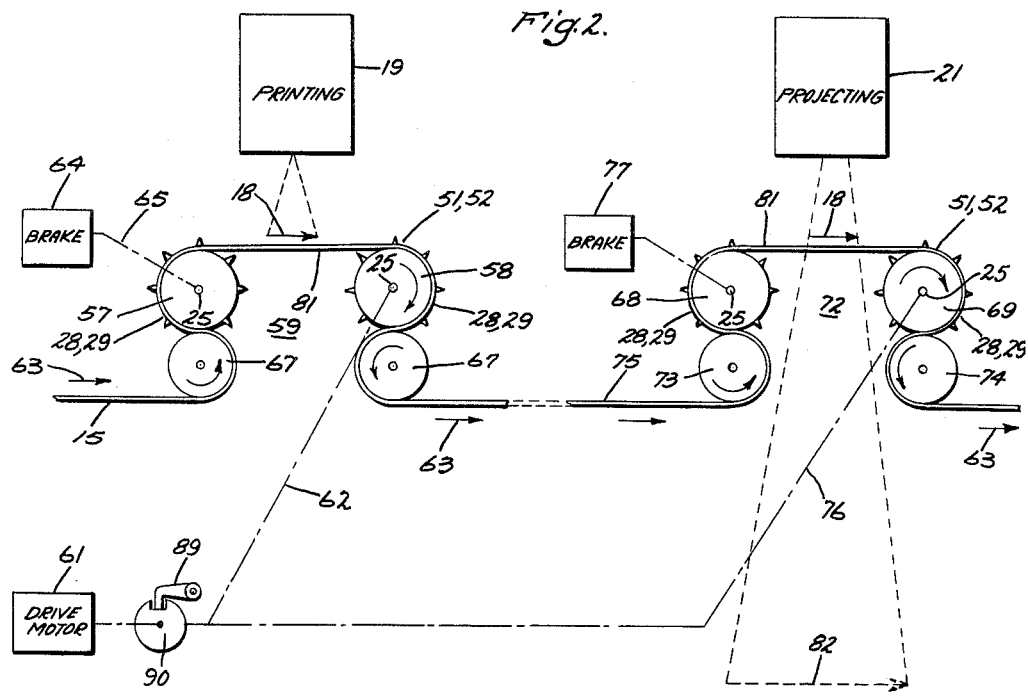
Inventor:
Joseph A. Stamm,
by Percy P. Tanty
Attorney.

United States Patent Office 3,240,116
Patented Mar. 15, 1966

3,240,116
APPARATUS FOR IMAGE FORMATION
AND PROJECTION
Joseph A. Stamm, Fort Wayne, Ind., assignor to International Telephone and Telegraph Corporation, Nutley, N.J., a corporation of Maryland
Filed Sept. 17, 1962, Ser. No. 224,093
14 Claims. (Cl. 88—24)

This invention relates generally to an apparatus for forming an image on film at a first location, transporting the film to a second location, and projecting the image at the second location.

There are instances where it is desired to provide a large area visual display of transitory information, such as a succession of radar plots superimposed upon fixed information such as a map overlay. To accomplish this objective, it has been proposed that the transitory information be formed at a first location on continuous photographic film which is then transported to a second location at which the image is projected onto a large area viewing screen, the fixed information being simultaneously projected onto the screen with separate projection apparatus. It is a requirement of such a projection system that the transitory and fixed images be in highly accurate registry when displayed on the viewing screen. While the two sets of projection apparatus may be accurately aligned with reference to the screen, due to dimensional and perforation inaccuracies in conventional perforated film, conventional techniques of perforated film handling are not capable of satisfying the stringent registration requirements for the two images. Since the fixed image is commonly projected from a slide and may thus be accurately pre-focused on the viewing screen, it is desirable to provide means for forming an image on perforated photographic film at a first location and transporting the film to a projecting location with repeatable accuracy which is independent of film dimensional and perforation accuracies.

It is accordingly an object of this invention to provide apparatus for forming an image on continuous photographic film at a first location, transporting the film to a second location, and projecting the image at the second location with repeatable accuracy independent of the accuracy of film dimensions.

A further object of the invention is to provide an improved differential sprocket wheel for use with perforated film which permits the relocation of a reference point on the film with respect to a reference location without regard to film dimensional accuracy.

The objects of the invention are broadly attained by applying transverse tension on the film at the first location using the outer edge of one perforation of a transverse pair of perforations as a reference, applying equal forward driving forces on the pair of perforations, forming the image on the film with a predetermined dimensional relationship with the said one perforation, transporting the film to the second location, applying transverse tension on the film at the second location using the outer edge of the said one perforation as a reference, applying equal forward driving forces on the said pair of perforations, and projecting the image. In this way, the image is formed on the film with a predetermined dimensional relationship with one perforation, and the film is then transported and positioned for projection at the second location by means of the same one perforation. With the image forming apparatus having a fixed predetermined dimensional relationship with the sprocket wheel, one tooth of which engages the said one reference perforation when the image is formed, and with the projection apparatus having a fixed predetermined dimensional relationship with another sprocket wheel, one tooth of which engages said one reference perforation of the film after its transportation to the second position, it will be seen that the film projection apparatus can be brought into accurate registry with the slide projection apparatus so that each film image will be in accurate registry with the fixed image regardless of any accuracies in the dimensions of the film and in the perforations.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a diagrammatic view in perspective showing the projection system in which the invention is employed;

FIG. 2 is a diagrammatic view showing the apparatus of the invention;

FIG. 3 is a cross-sectional view showing the improved differential sprocket wheel of the invention; and FIGS. 4 and 5 are diagrammatic views of the film in the image-formation and printing locations respectively, useful in explaining the method of the invention.

Referring now to FIG. 1 of the drawing, there is shown a large area viewing screen 10 upon which there is projected by means of conventional projection apparatus 11 a fixed image 12, shown here as being a system of rectangular grid coordinates. The fixed image 12 may be projected from a conventional slide 13 and it will be readily understood may take any desired forms other than the grid coordinate shown, such as a map. In order to project a second transitory image 14 upon the screen 10 superimposed upon the fixed image 12 and in accurate registry therewith, a continuous photographic film 15 is provided having conventional evenly-spaced perforations 16 and 17 formed therein adjacent its margins. Image 18 is formed on the film 15 at a first location, as by conventional printing apparatus 19 and the film 15 is then moved to a second location at which it is projected onto screen 10 by projection apparatus 21.

Referring now to FIG. 3 of the drawing, there is shown a differential sprocket wheel 22 having two transversely spaced film supporting and engaging drums 23 and 24 independently rotatably mounted on shaft 25. The outer peripheries 26, 27 of drums 23, 24 are adapted to support and engage film 15, as shown. Drum 23 has a plurality of evenly spaced sprocket teeth 28 formed around its periphery 26 and drum 24 has a plurality of evenly-spaced sprocket teeth 29 formed around its periphery, teeth 28, 29 being adapted respectively to engage the perforations of rows 16 and 17 of film 15 (FIGS. 1 and 4).

Drum 23, while mounted on shaft 25 for rotation with respect thereto, is restrained against transverse movement on shaft 25 in any suitable manner, as by suitable collars 31, 32. Drum 24 is, however, mounted on hub portion 33 of intermediate drum 34 by a splined connection for rotation with respect thereto and also for transverse movement thereon. Thus, it will be seen that intermediate drum 34 rotates with drum 24, but that drum 24 is free to move transversely with respect to drum 34. Drum 34 has its peripheral surface 36 also arranged to support and engage film 15 as shown. Driving torque is transmitted from the shaft 25 to the drums 23, 24 and 34 by means of a gear differential 37. A first bevel gear 38 is secured to the inner face 39 of drum 23 in any suitable manner, as by a threaded fastener 40. A second bevel gear 42 is secured to the inner face of drum 34 in any suitable manner, as by threaded fastener 43. A bevel planet gear 44 meshes respectively with gears 38, 42 and is secured to rotate with shaft 25 by a cage assembly 45 which rotatably supports gear 44 and is secured for rotation with shaft 25.

A coil spring 46 is provided surrounding hub portion 33 of drum 34 with its ends respectively engaging the facing surfaces 47 and 48 of drums 34, 24. It will thus be seen that spring 46 urges drum 24 in a direction transversely away from drum 23, as shown by the arrow 49. Collar 50 on shaft 25 engages the end of hub 33 of drum 34 thus keeping gears 38, 42 and 44 in mesh and limiting axial movement of drum 34. It will be seen that the maximum distance between the outer sides of teeth 28, 29, as limited by collar 50 engaging drum 24, is slightly greater than the maximum distance between the outer edges of the perforations of rows 16, 17, including the maximum tolerance buildings.

It will now be seen that with individual sprocket teeth 51 and 52 of sets 28, 29 on drums 23, 24 respectively engaging perforations 53, 54 of rows 16, 17 in film 15, spring 46 will cause teeth 51 and 52 respectively to engage the outer edges of perforations 53, 54 in film 15 on the sprocket teeth 51, 52 with tension in the transverse direction 49.

By virtue of the restraint against transverse movement of drum 23, the outer edge 55 of perforation 53 is utilized as a reference, tension being applied on outer edge 56 of the other perforation 54 by tooth 52 on drum 24 both to provide engagement of outer edges 55, 56 of film perforations 53, 54, and also to provide for flattening of the film in the transverse direction.

It will further be seen that by virtue of the provision of the gear differential 37 any difference in the restriction torques applied to the teeth 51, 52 will result in relative rotational movement of the two drums 23, 24 until the torques are equal.

Referring now to FIG. 2, two identical sprocket wheels 57 and 58 are provided of the type described above and illustrated in FIG. 3, sprocket wheels 57 and 58 being spaced apart to define the first or printing location 59. Printing apparatus 19 is disposed so as to print or otherwise form image 18 on film 15 at the location 59 between the two sprockets 57, 58 as will be hereinafter more fully described. Shaft 25 of sprocket wheel 58 is connected to a suitable drive motor 61 as indicated by the dashed lines 62 for rotating sprocket wheel 58 so as to advance film 15 in the direction shown by the arrows 63. Shaft 25 of the sprocket wheel 57 is connected to a suitable brake or drag device 64 as shown by dashed line 65, so as to apply back tension on the film at the printing position 59. Film 15 is fed from a suitable source (not shown), passed around an idler roller 67 around the drag sprocket 57 with the perforations of its rows 16, 17 respectively engaged by the sprocket teeth 28, 29 of sprocket 57, around the drive sprocket 58 with the perforations of rows 16, 17 in engagement with its teeth 28, 29, and around idler roller 68.

Another pair of spaced-apart sprocket wheels 68 and 69 are provided defining therebetween the projecting location 72; sprocket wheels 68 and 69 are identical with each other and the sprocket wheels 57, 58, and are constructed as shown in FIG. 3. The film 15 extends from idler roller 67 associated with sprocket wheel 58 to idler roller 73, around sprocket wheel 68 being engaged by its teeth 28, 29, around sprocket wheel 69 being engaged by its teeth 28, 29, and around idler roller 74.

Sprocket wheel 69 has its shaft 25 connected to be driven by motor 61 as shown by dashed lines 76, in order to advance film 15 in the direction shown by the arrows 63. Shaft 25 of sprocket wheel 68 is connected to brake or drag device 77, as shown by dashed line 78 in order to apply back tension on the film 15 between the two sprocket wheels 68, 69. In accordance with the invention, drive motor 61 is connected, as by suitable gearing, to drive sprocket wheels 58, 69 in synchronism.

Referring now additionally to FIGS. 4 and 5, printing device 19 is positioned at printing location 59 so as to form image 18 on the section 81 of film intermediate sprocket wheels 57, 58, the printing device 19 having a fixed predetermined dimensional relationship with sprocket wheel 58. Projecting apparatus 21 is located at the projecting location 72 and has the same predetermined fixed dimensional relationship with sprocket wheel 69 as the printing device 19 has with the sprocket wheel 58 so that when the image 18 has been transported to the projecting location 72 and occupies the same position with respect to sprocket wheel 69 as it did with respect to sprocket wheel 58 when it was initially formed, the image will be projected as shown by the dashed line 82 of FIG. 2.

Assuming now that movement of the film 15 is momentarily arrested with teeth 51, 52 of sprocket wheel 58 engaging perforations 53, 54 of film 15, it will be seen that by virtue of the differential action provided by the sprocket wheel 58, the teeth 51, 52 will respectively engage the forward edges 83, 84 of the perforations 53, 54 and that by virtue of the transverse tension provided by spring 46, teeth 51, 52 will also respectively engage the outer edges 55, 56 of the perforations 53, 54. Likewise, by virtue of the drag exerted on the sprocket wheel 57, a pair of its teeth 85, 86 engaging a transverse pair of perforations 87, 88 will respectively engage the trailing edges and the outer edges of these perforations. Thus, it will be seen that the section of film 81 is flattened both transversely and axially. Recalling that teeth 51 of sprocket wheel 58 and teeth 85 of sprocket wheel 57 are transversely fixed whereas teeth 52, 86 are respectively transversely moveable under the influence of springs 46, it will be observed that the outer edges 55 and 89 or perforations 53, 87 provide a reference location, any variation in the transverse width of the film or of the perforations being taken up by transverse movement by teeth 52, 86 under the influence of springs 46.

It will now be seen that when image 18 is formed on the section of film 81, the image will bear a fixed predetermined dimensional relationship "a" with the leading edge 83 of perforation 53 and a predetermined fixed transverse dimensional relationship "b" with the outer edge 55 of the perforation 53.

With the image 18 thus formed on section 81 of film 15 at the printing location 59, the drive motor 61 is actuated to rotate the sprocket wheels 58, 69 so as to transport or advance the section 81 of film 15 in the direction 63 to the projecting location 72. It will be observed at this point that by virtue of the equal driving torques applied to the leading edges of the perforations engaged by the teeth of driving sprocket wheels 58, 69, and the equal restraining torques applied to the trailing edges of the perforations engaged by the teeth of the drag sprockets 57, 68, any tendency for skew of the film as it is moved in the direction 63 is prevented.

It will be observed that at the projecting location 72 with the image 18 positioned for projection by the projecting apparatus 21, the same perforations 53, 54 which were engaged by teeth 51, 52 of sprocket wheel 58 when the image was formed at the printing location 59 are now engaged by teeth 51, 52 of sprocket wheel 69. Again by virtue of the fact that teeth 51 of sprocket wheel 69 and 85 of sprocket wheel 68 are transversely fixed whereas teeth 52 of sprocket wheel 69 and 86 of sprocket wheel 68 are transversely moveable under the influence of springs 46, teeth 51 and 52 of sprocket wheel 69 will engage the outer edges 55, 56 of perforations 53, 54 and teeth 85, 86 will engage the outer edges of perforations 87, 88, the outer edges 55 and 89 of perforations 53 and 87 again serving as a reference. Recalling that image 18 when formed at printing location 59 has a fixed predetermined dimensional relationship "a" and "b" with the leading edge 83 and outer edge 55 of perforation 53, respectively, it will be observed that the image 18 at the projecting location 72 likewise has the same predetermined dimensional relationship "a" and "b" the leading and outer edges 83, 55 respectively of the same perforation 53. It will be further observed that the differential action of the two sprocket wheels 68, 69 again applies equal restraining and driving torques respectively on the trailing and leading edges of the respective perforations so that the section of film 31 at the projecting location 72 is both axially and transversely flattened.

In order to increase the positional accuracy of the system, it is desirable to employ the same reference set of sprocket teeth 51, 52 to hold the film 15 each time an image 18 is formed thereon at position 59 and each time the image 18 is projected at the projecting location 72. This is accomplished by arranging the driving mechanisms 62, 76 so that each of the driving sprockets 58, 69 is rotated an integral number of full revolutions for each transportation of section 81 of film 15 having an image 18 thereon from the printing location 59 to the projecting location 72, and further by providing a means for arresting advancement of the film only when the predetermined reference teeth 51, 52 of each of the driving sprocket wheels 58, 69 are in engagement with film perforations. This is accomplished by providing a dog and cam combination 89, 90 cooperatively associated with the drive 62, 76 and the drive motor 61 so that the advancement of film 15 is arrested to permit printing of an image 18 at printing location 59, and likewise projection of an image 18 at the projecting location 72 only when the preselected or reference sprocket teeth 51, 52 of the driving sprocket wheels 58, 69 are respectively in engagement with respective perforations. It will be readily seen that the printing and projecting locations 59, 72, need not be spaced apart by a distance corresponding to the separation between two adjacent images 18, but on the contrary may be spaced apart by any desired distance in excess of the spacing between two adjacent images formed on the film, the requirement being that when the driving sprocket wheels 58, 69 are synchronously rotated an integral number of times, image 18 moves into the projecting location 72. Thus, two, three or any number of images may be formed successively on film 15 before the first one of these images arrives at the projecting location 72 for projection. The length of film 75 between the reference teeth 51, 52 of driven sprocket wheels 58, 69 must be a multiple of the film travel corresponding to a complete revolution of the driven sprocket. The film length between the reference teeth 51, 52 of sprocket wheels 58, 69 is preferably measured in terms of the number of perforations along the film length; this length is therefore equal to a number of perforations equal to a multiple of the number of teeth 28, 29 around the periphery of the driven sprocket wheels 58, 69. While the distance between the printing position 59 and the projection position 72 may vary as desired, and the film 75 between rollers 68, 73 may form a loop of any desired length, the variation of total film length between the driven sprocket wheels 58, 69 must be thus restricted. Measurement of film length in terms of the number of perforations removes the positional error associated with the error of perforation spacing along the film length.

While differential sprocket wheels 57, 68 identical to the driving sprocket wheels 58, 69 have been shown employed for respectively applying back tension on the film at the printing and projecting locations 59, 72, respectively, it will be readily understood that other means of applying back tension may be employed. It will further be seen that the two driving sprocket wheels 58, 69 may be synchronously driven either mechanically, or electrically, as by synchros, and will also be seen that other forms of differential gear systems may be employed in the differential sprocket wheels for differentially connecting the two sets of sprocket teeth to the shaft 25.

While I have described above the principles of my invention in connection with specific apparatus, it is to be clearly understood that this description is made only by way of example and not as a limitation to the scope of my invention.

What is claimed is:

1. In apparatus for forming an image on continuous photographic film at a first location and for projecting said image at a second location; apparatus for positioning said film at said first and second locations and for transporting said film therebetween with repeatable accuracy independent of the accuracy of film dimensions, said positioning and transporting apparatus comprising: an elongated photographic film having first and second rows of evenly spaced transversely aligned perforations respectively adjacent and parallel with the film margins; first and second sprocket wheels respectively engaging said film; means for respectively rotatably supporting said wheels; means respectively coupled to said supporting means for driving said wheels thereby to move said film in a direction from said first location toward said second location, said wheels being respectively spaced from said locations in the direction of movement of said film; each of said sprocket wheels comprising first and second sets of evenly spaced relatively rotatable sprocket teeth on said supporting means for respectively engaging the perforations of said first and second rows, means respectively coupling said first and second sets of teeth to said supporting means for driving said sets of teeth so as to apply equal driving force to the leading edges of respective pairs of perforations, said first set of teeth being transversely fixed with reference to the respective supporting means, said second set of teeth being transversely moveable with respect to said first set, and means for resiliently urging said second set of teeth transversely away from said first set whereby said sets of teeth respectively engage the outer edges of respective pairs of perforations; and means respectively spaced from said locations in the direction opposite from said direction of movement for applying back tension on said film whereby said film is transversely and axially flat at said first and second locations respectively.

2. The apparatus of claim 1 wherein said first and second sprocket wheels respectively have the same number of teeth in each set, and wherein said driving means drives said wheels in synchronism.

3. The apparatus of claim 1 wherein said last-named means comprises third and fourth sprocket wheels respectively identical to said first and second sprocket wheels, and further comprising means for respectively applying a drag on said third and fourth wheels.

4. The apparatus of claim 3 wherein said first and third sprocket wheels and said second and fourth sprocket wheels are respectively spaced apart to define said first and second locations therebetween.

5. The apparatus of claim 1 further comprising means for forming an image on said film at said first location and having a predetermined fixed dimensional relationship with said first sprocket wheel whereby said image has a fixed dimensional relationship with one perforation of said first row which is engaged by one tooth of said first set when said image is formed, and means for projecting said image at said second location and having a predetermined fixed dimensional relationship with said second sprocket wheel such that when said image is positioned for projection at said second location said one perforation is engaged by one tooth of said first set of teeth of said second wheel.

6. The apparatus of claim 5 wherein said first and second sprocket wheels are substantially identical and respectively have the same number of teeth in each set, said driving means being arranged to drive said first and second wheels in synchronism with a predetermined number of complete revolutions of each wheel to transport said image from said first location to said second location, and further comprising means for arresting said driving means to permit formation and projection of an image respectively, said arresting means being arranged to arrest said driving means at one predetermined rotational position of said first and second wheels whereby the same one of said first set of teeth of said first wheel engages said one perforation when said image is formed at said first location and the same one of said first set of teeth of said second wheel engages said one perforation when said image is in said second location.

7. Apparatus for forming an image on continuous photographic film at a first location, for projecting said image at a second location, and for positioning said film at said first and second locations respectively and transporting said film therebetween with repeatable accuracy independent of the accuracy of film dimensions, said apparatus comprising: an elongated photographic film having first and second rows of evenly spaced transversely aligned perforations respectively adjacent and parallel with the film margins; first and second sprocket wheels respectively engaging said film; third and fourth sprocket wheels respectively engaging said film; means for respectively rotatably supporting said wheels; means respectively coupled to the supporting means of said first and third wheels for driving the same thereby to move said film in a direction from said first location toward said second location, said first and third wheels being respectively spaced from said second and fourth wheels in the direction of movement of said film thereby respectively defining said first and second locations therebetween; means respectively coupled to the supporting means of said second and fourth wheels for respectively applying a drag thereon thereby applying back tension on said film whereby said film is transversely and axially flat at said first and second locations respectively; each of said wheels comprising first and second sets of evenly spaced relatively rotatable sprocket teeth on said supporting means for respectively engaging the perforations of said first and second rows, means respectively coupling said first and second pairs of teeth to said supporting means for driving said sets of teeth so as to apply equal driving force to the leading edges of respective pairs of perforations engaged by the teeth of said first and third wheels and to the trailing edges of respective pairs of perforations engaged by the teeth of said second and fourth wheels, said first set of teeth being transversely fixed with reference to the respective supporting means, said second set of teeth being transversely movable with respect to said first set, and means resiliently urging said second set of teeth transversely away from said first set whereby said sets of teeth respectively engage the outer edges of respective pairs of perforations; said sprocket wheels being substantially identical and respectively having the same number of teeth in each set; means for forming an image on said film at said first location and having a predetermined fixed dimensional relationship with said first wheel whereby said image has a fixed dimensional relationship with the one perforation of said first row which is engaged by one tooth of said first set of said first wheel when said image is formed; means for projecting said image at said second location and having a predetermined fixed dimensional relationship with said second wheel such that when said image is positioned for projection at said second location said one perforation is engaged by one tooth of said first set of said second wheel; said driving means being arranged to rotate said first and third wheels in synchronism with a predetermined number of complete revolutions of each wheel to transport said film from said first location to said second location; and means for arresting said driving means to permit formation and projection of an image respectively, said arresting means being arranged to arrest said driving means at one predetermined rotational position of said first and third wheels, there being a predetermined length of said film extending between said locations and having a plurality of perforations in each row equal to a multiple of the number of teeth in each set of said sprocket wheels, whereby the same one of said first set of teeth of said first wheel engages said one perforation when said image is formed at said first location and the same one of said first set of teeth of said second wheel engages said one perforation when said image is in said second location.

8. The apparatus of claim 1 wherein said coupling means comprises differential means having first and second elements respectively connected to said supporting means and driven thereby.

9. The apparatus of claim 1 wherein each of said supporting means comprises a shaft, said first and second sets of teeth of each wheel being rotatably mounted on the respective shaft, and wherein said coupling means comprises a gear differential having first and second gears respectively connected to said first and second sets of teeth and rotatable therewith, a planet gear meshing with said first and second gears, and a cage connecting said planet gear to the respective shaft for rotation therewith.

10. The apparatus of claim 1 wherein each of said supporting means comprises a shaft, wherein each of said sprocket wheels further comprises first and second transversely spaced drum members for engaging and supporting said film, said first drum member being rotatably supported on said shaft, said first and second sets of teeth being respectively secured to the peripheries of said first and second drum members, means securing said first drum member against transverse movement on said shaft, a third drum member rotatably supported on said shaft intermediate said first and second drum members and having a hub portion extending toward said second drum member, said second drum member being splined to said hub portion and spaced from said third drum member whereby said second and third drum members rotate together but are transversely movable with respect to each other, said third drum member engaging and supporting said film, wherein said coupling means comprises differential gearing having a first bevel gear secured to said first drum member on the side thereof facing said third drum member, a second bevel gear secured to said third drum member on the side thereof facing said first gear, a bevel planet gear meshing with said first and second gears, and a planet cage rotatably mounting said planet gear and secured to said shaft for rotation therewith intermediate said first and second gears, and wherein said urging means comprises a coil spring surrounding said hub portion and engaging said second and third drum members.

11. A differential sprocket wheel for continuous perforated film having first and second rows of evenly spaced transversely aligned perforations respectively adjacent and parallel with the film margins, said wheel comprising: rotatable driving means, first and second sets of evenly spaced relatively rotatable sprocket teeth on said driving means for respectively engaging the perforations of said first and second rows, said first set of teeth being transversely fixed with reference to said driving means, said second set of teeth being transversely movable with respect to said first set, means for resiliently urging said second set of teeth transversely away from said first set so that sets of teeth respectively engage the outer edges of respective pairs of perforations, and means respectively coupling said first and second sets of teeth to said driving means so as to apply equal driving force to corresponding axial edges of respective pairs of perforations.

12. The apparatus of claim 11 wherein said coupling means comprises differential means having first and second elements respectively connected to drive said first and second sets of teeth and a third element connected to said driving means and driven thereby.

13. The apparatus of claim 11 wherein said driving means is a shaft, said first and second sets of teeth being rotatably mounted on said shaft, and wherein said coupling means comprises a gear differential having first and second gears respectively connected to drive said first and second sets of teeth and rotatable therewith, a planet gear meshing with said first and second gears, and a cage connecting said planet gear to said shaft for rotation therewith.

14. A differential sprocket wheel for continuous perforated film having first and second rows of evenly spaced transversely aligned perforations respectively adjacent and parallel with the film margins, said wheel comprising: a rotatable driving shaft; first and second transversely-spaced drum members having peripheral surfaces adapted to engage and support said film, said first drum member being rotatably supported on said shaft, first and second sets of evenly spaced teeth respectively secured to the peripheries of said drum members for respectively engaging the perforations of said first and second rows; means securing said first drum member against transverse movement on said shaft; a third drum member rotatably mounted in said shaft intermediate said first and second drum members and having a hub portion extending toward said second drum member; said second drum member being splined to said hub portion and spaced from said third drum member whereby said second and third drum members rotate together but are transversely movable with respect to each other, said third drum member having a peripheral surface adapted to engage and support said film; differential gearing respectively connecting said first and second drum members to said shaft whereby said first and second sets of teeth apply equal driving force to corresponding axial edges of respective pair of perforations, said gearing comprising a first bevel gear secured to said first drum member on the side thereof facing said third drum member, a second bevel gear secured to said third drum member on the side thereof facing said first gear, a bevel planet gear meshing with said first and second gears, and a planet cage rotatably mounting said planet gear and secured to said shaft for rotation therewith intermediate said first and second gears; and a coil spring surrounding said hub portion and respectively engaging said second and third drum members for urging said second drum member and second set of teeth away from said first drum member and first set of teeth whereby said sets of teeth respectively engage the outer edges of respective pairs of perforations.

References Cited by the Examiner

UNITED STATES PATENTS

| | | | |
|---|---|---|---|
| 1,972,555 | 9/1934 | Fear | 352—80 X |
| 2,393,471 | 1/1946 | Johnson | 226—86 |
| 2,586,772 | 2/1952 | Ashby et al. | 343—9 |
| 2,630,901 | 3/1953 | Johnson et al. | 226—79 |
| 2,972,741 | 2/1961 | Hammond | 343—5 |

FOREIGN PATENTS 493,771  2/1950  Belgium.

NORTON ANSHER, *Primary Examiner.*

EMIL G. ANDERSON, *Examiner.*